(12) United States Patent
Kumar et al.

(10) Patent No.: US 8,435,668 B2
(45) Date of Patent: May 7, 2013

(54) PRISMATIC BATTERY CELL WITH INTEGRATED COOLING PASSAGES AND ASSEMBLY FRAME

(75) Inventors: Vinod Kumar, Pittsford, NY (US); Richard C. Deming, Bruce, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 340 days.

(21) Appl. No.: 12/842,478

(22) Filed: Jul. 23, 2010

(65) Prior Publication Data

US 2012/0021270 A1 Jan. 26, 2012

(51) Int. Cl.
*H01M 6/46* (2006.01)
(52) U.S. Cl.
USPC ............... 429/162; 429/120; 429/163
(58) Field of Classification Search .......... 429/162–163, 429/120
See application file for complete search history.

(56) References Cited

U.S. PATENT DOCUMENTS

2008/0299449 A1* 12/2008 Yun et al. ............... 429/120

* cited by examiner

*Primary Examiner* — Jane Rhee
(74) *Attorney, Agent, or Firm* — Fraser Clemens Martin & Miller LLC; J. Douglas Miller

(57) ABSTRACT

A battery cell assembly includes a main body configured to generate power from an electrochemical reaction. The main body has a first end and a second end, a first side and a second side, and a first major surface and a second major surface. A pair of electrical tabs extends outwardly at the first end of the main body. An insulating element is disposed adjacent the first major surface of the main body. A cooling element is disposed adjacent the second major surface of the main body. The cooling element includes at least one cooling passage. The at least one cooling passage is in heat exchange relationship with the main body and configured to transfer heat generated during the electrochemical reaction away from the main body.

19 Claims, 8 Drawing Sheets

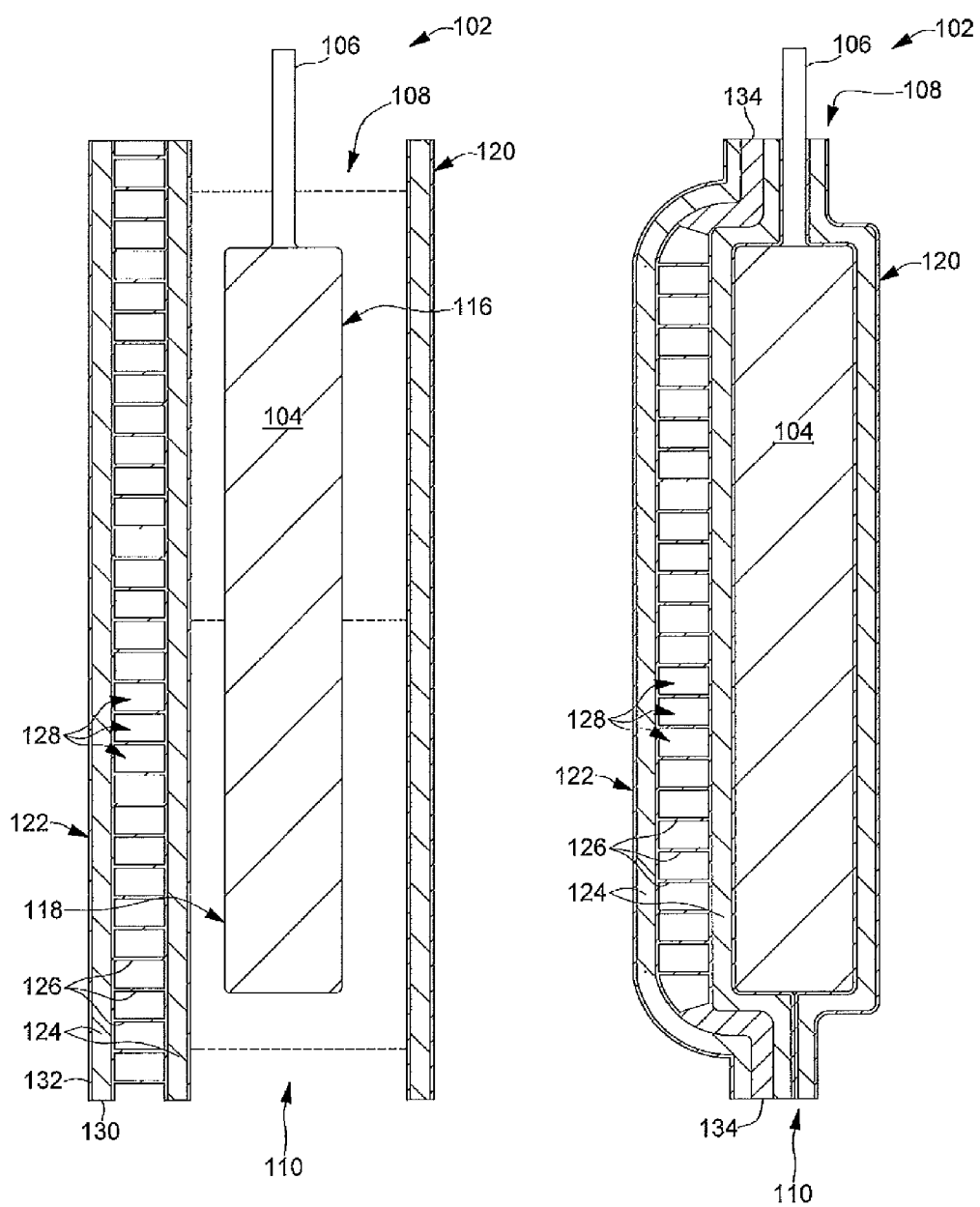
FIG. 2   FIG. 3

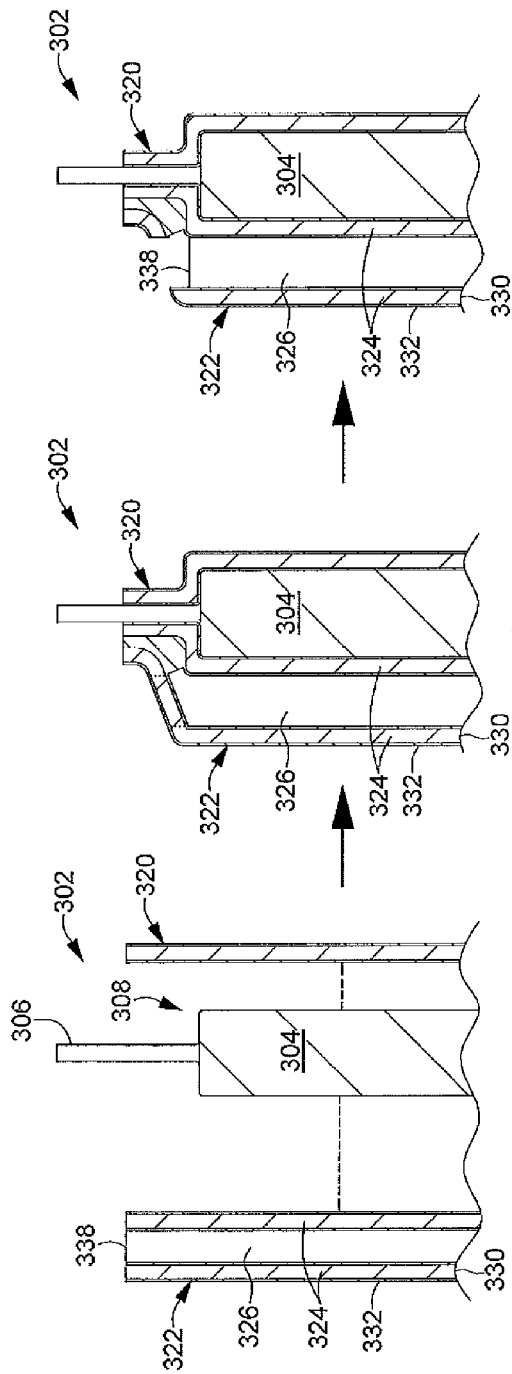
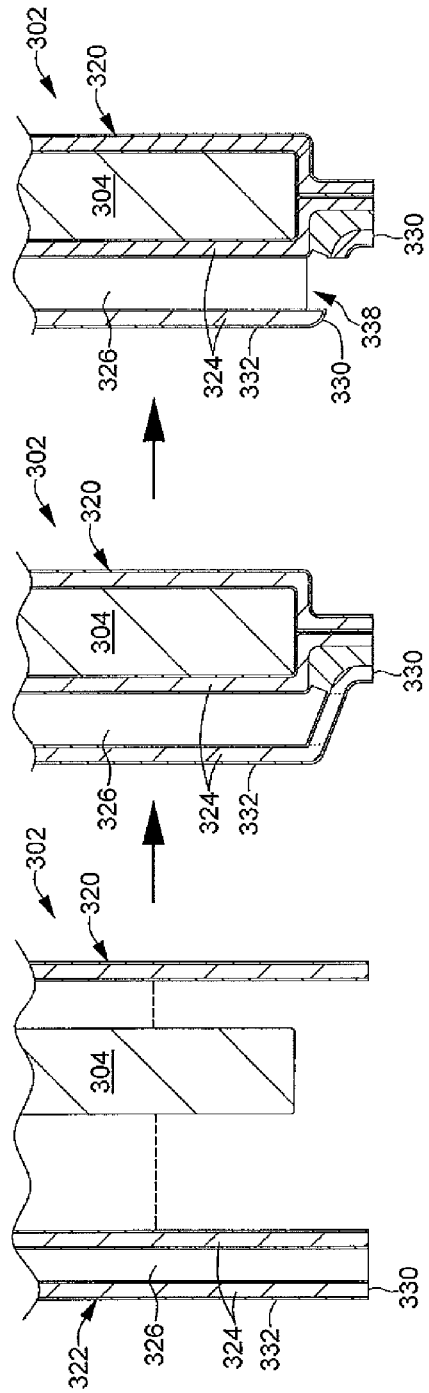

PRISMATIC BATTERY CELL WITH INTEGRATED COOLING PASSAGES AND ASSEMBLY FRAME

FIELD OF THE INVENTION

The present disclosure relates to a battery cell assembly and more particularly to a battery cell assembly with an integrated cooling element.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begin with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in a battery pack assembly is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions. The cooling systems may include cooling plates or fins sandwiched between individual battery cells within the battery pack. The cooling system may have channels through which a coolant flows in a heat transfer relationship with the battery cells.

There is a continuing need for a battery cell design that combines the function of an air cooling fin with the battery cell design, removes heat generated in the battery cell with lower thermal gradients in a thickness direction of the battery cell, and provides for a more uniform temperature across a surface of the battery cell. Desirably, the battery cell design reduces the number of components required for assembly of a battery pack assembly, permits a stacking of the battery cells against each other during the battery pack assembly without requiring any intervening components, and permits a flow of a cooling fluid such as air through the battery cells from inlet and outlet manifolds installed on the battery pack assembly.

SUMMARY OF THE INVENTION

In concordance with the instant disclosure, a battery cell design that combines the function of an air cooling fin with the battery cell design, removes heat generated in the battery cell with lower thermal gradients in a thickness direction of the battery cell, provides for a more uniform temperature across a surface of the battery cell, reduces the number of components for assembly of a battery pack assembly, permits a stacking of the battery cells against each other during the battery pack assembly without requiring any intervening components, and permits a flow of a cooling fluid such as air through the battery cells from inlet and outlet manifolds installed on the battery pack assembly, is surprisingly discovered.

In a first embodiment, a battery cell assembly includes a main body configured to generate power from an electrochemical reaction. The main body has a first end and a second end, a first side and a second side, and a first major surface and a second major surface. A pair of electrical tabs extends outwardly at the first end of the main body. An insulating element abuts the first major surface of the main body. A cooling element abuts the second major surface of the main body. The cooling element includes at least one cooling passage. The at least one cooling passage is in heat exchange relationship with the main body and configured to transfer heat generated during the electrochemical reaction away from the main body.

In a further embodiment, the cooling element includes a plurality of cooling passages. The cooling element also includes a pair of spaced apart layers with a plurality of webs disposed therebetween. The webs define the cooling passages of the cooling element. The cooling passages of the cooling element extend from the first side of the main body to the second side of the main body.

In another embodiment, the cooling passages of the cooling element extend from the first end of the main body to the second end of the main body.

In an additional embodiment, the cooling passages of the cooling element extend from one of the first side and the second side of the main body to one of the first end and the second end of the main body.

DRAWINGS

The above, as well as other advantages of the present disclosure, will become readily apparent to those skilled in the art from the following detailed description, particularly when considered in the light of the drawings described herein.

FIG. 2 is an unassembled side elevational cross-sectional view of the battery cell shown in FIG. 1;

FIG. 3 is an assembled side elevational cross-sectional view of the battery cell shown in FIGS. 1 and 2;

FIG. 9 is an enlarged unassembled fragmentary side elevational cross-sectional view and an enlarged assembled fragmentary side elevational cross-sectional view illustrating a stepwise assembly and removal of a portion of a cooling element of the battery cell, and taken along section line 9-9 of FIG. 8;

FIG. 10 is an enlarged unassembled fragmentary side elevational cross-sectional view and an enlarged assembled fragmentary side elevational cross-sectional view illustrating a stepwise assembly and removal of a portion of a cooling element of the battery cell, and taken along section 10-10 of FIG. 8;

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
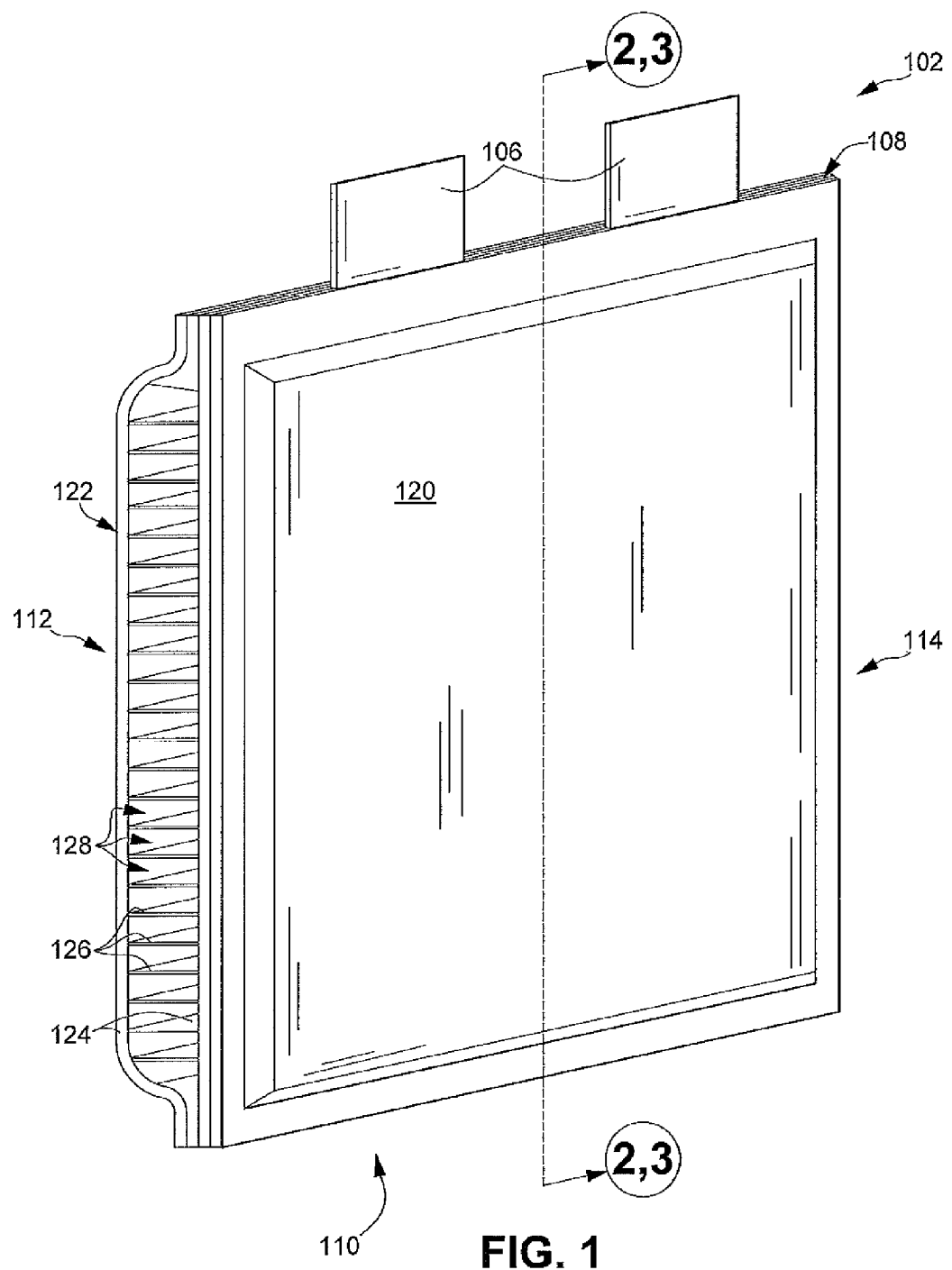
FIG. 1 is a front perspective view of a battery cell according to one embodiment of the present disclosure.
Figure 4:
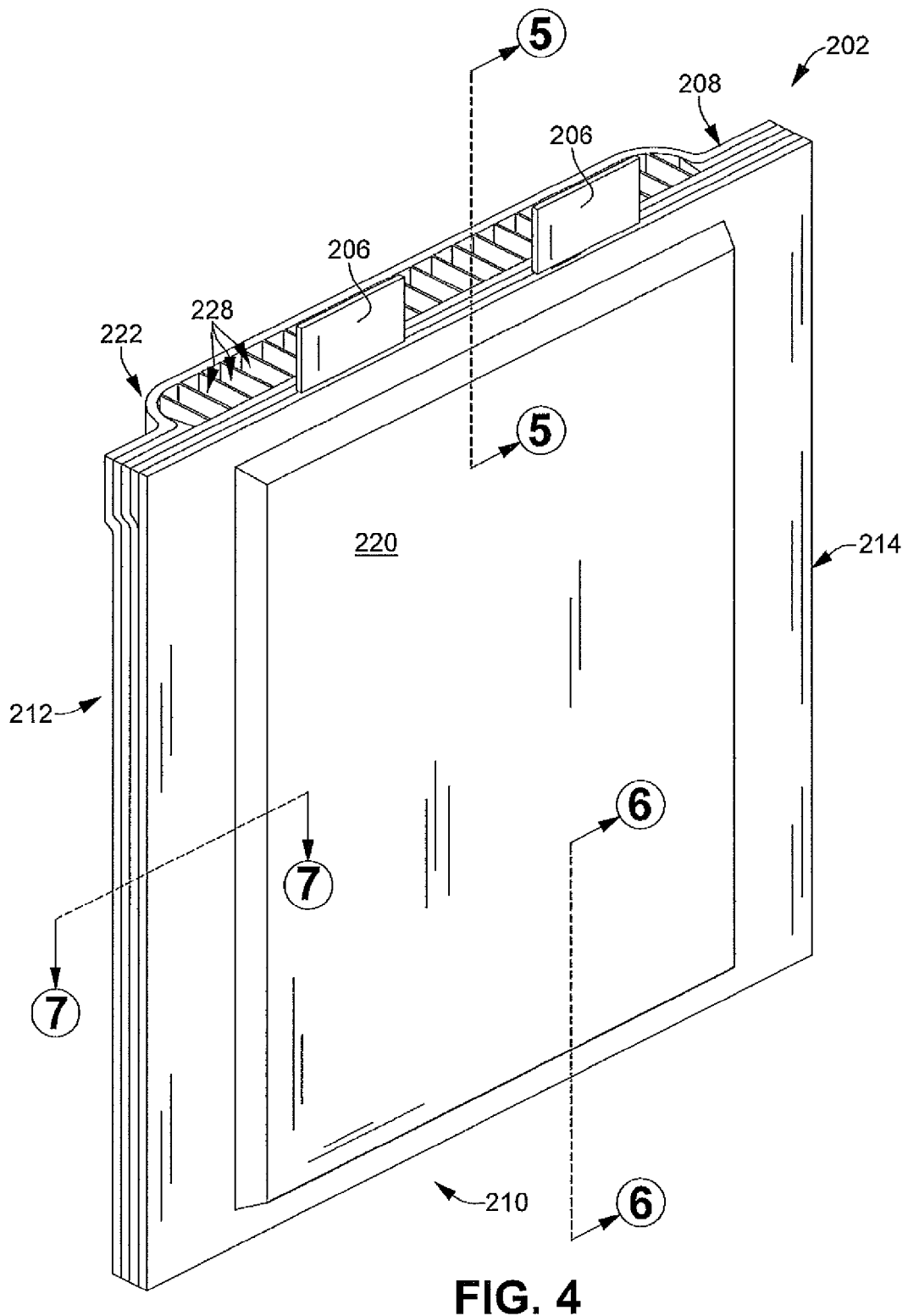
FIG. 4 is a front perspective view of a battery cell according to another embodiment of the present disclosure.

With reference to FIGS. 1-3, a battery cell assembly 102 according to one embodiment the present invention is shown. The battery cell assembly 102 includes a main body 104 of a battery cell and a pair of electrical tabs 106. The main body 104 of the battery cell is configured to generate power from an electrochemical reaction within the main body 104. The main body 104 may include, for example, electrode coated current collector plates, liquid electrolytes, and separator films as are generally known in the art. The electrical tabs 106 are suitable for placing the battery cell assembly 102 in electrical communication with additional battery cell assemblies 102, for example, via an interconnect board (not shown) to form a battery pack (not shown) suitable for powering an electric vehicle. As a further example, the battery cell assembly 102 may be a lithium ion (Li-ion) battery cell. It should be appreciated that other types of the battery cell assembly 102, employing at least one of a different structure and a different electrochemistry, may also be used within the scope of the present invention.

The main body 104 of the battery cell assembly 102 may be prismatic, i.e., have substantially parallel sides and suitable for stacking to form a battery pack. The main body 104 includes a first end 108 and a second end 110, a first side 112 and a second side 114, and a first major surface 116 and a second major surface 118. The electrical tabs 106 extend outwardly from the first end 108 of the main body 104. An insulating element 120 abuts the first major surface 116 of the main body 104. A cooling element 122 abuts the second major surface 118 of the main body 104. It should be understood that the insulating element 120 and the cooling element 122 together form a "pouch" or a "frame" that securely holds the main body 104 of the battery cell assembly 102. The insulating element 120 and the cooling element 122 may be heat sealed, for example, to each other to secure the main body 104 of the battery cell assembly 102.

As a nonlimiting example, the insulating element 120 may include a metal layer having a polymer coating. The polymer coating may be formed from a plastic material configured to deform during application of at least one of heat and pressure. The polymer coating facilitates a sealing of the insulating element 120 to each of the cooling element 122 and the main body 104 of the battery cell assembly 102. It should be understood that the insulating element 120 may be formed from other materials and composites providing electrical insulation of the main body 104, as desired.

The cooling element 122 may include a pair of spaced apart layers 124 with a plurality of spaced apart webs 126 disposed therebetween. The webs 126 define a plurality of cooling passages 128 of the cooling element 122. The cooling passages 128 are in a heat exchange relationship with the main body 104. The cooling passages 128 are configured to transfer heat generated during the electrochemical reaction away from the main body 104. As a nonlimiting example, the cooling passages 128 are in fluid communication with inlet and outlet manifolds (not shown) for circulation of a fluid such as air through the cooling passages 128.

In another example, the cooling element 122 may include one or more additional spaced apart layers (not shown) between the pair of spaced apart layers 124. The additional spaced apart layers may be formed from the same or a different material as one of the pair of spaced apart layers 124 and the webs 126, as desired. The additional spaced apart layers may provide a "honeycomb" structure, for example, with a plurality of cooling passages 128 distributed across a thickness of the cooling element 122.

In a further example, the cooling passages 128 may be at least one of impregnated and filled with a miscellaneous material such as a heat sink material to efficiently draw heat away from the main body 104 of the battery cell assembly 102. The cooling element 122 can thereby be used to pack miscellaneous materials with the battery cell assembly 102, the miscellaneous materials being isolated physically from the main body 104 of the battery cell. One of ordinary skill in the art may select suitable heat sink materials, having sufficient thermal conduction properties, as desired. Other means for transferring heat from the main body 104 via the cooling passages 128 may also be employed within the scope of the present disclosure.

Each of the pair of spaced apart layers 124 is formed from a metal sheet 130 with a polymer coating 132. The webs 126 of the battery cell assembly 102 may be formed from a polymer, for example. In other examples, the webs 126 are formed from a deformable metal such as a thin aluminum extrusion. In a particular embodiment, the webs 126 and the polymer coating 132 are formed from a plastic material configured to deform during an application of at least one of heat and pressure to seal the cooling element 122 to the main body 104. The polymer of the webs, and the polymer coating 132, may be formed from a same or different material as the one or more polymer coatings of the insulating element 120, as desired.

During the sealing process, as illustrated in FIGS. 2-3, it should be appreciated that at least a portion of the inlet and outlet ends of the cooling passages 128 are not flattened or closed, in order to permit a flow of a cooling fluid such as air therethrough. It should also be appreciated that the cooling passages 128 do not affect the integrity of the seal around the cell components such as the electrode coated current collector plates, electrolytes, and separators of the main body 104, and the electrical tabs 106.

In the embodiment shown in FIGS. 1-3, the cooling passages 128 of the cooling element extend from the first side 112 of the main body 104 to the second side 114 of the main body 104. The cooling passages 128 are substantially linear, as shown, although other shapes may also be employed within the scope of the disclosure. The main body 104 is sealed between the insulating element 120 and the cooling element 122 at the first end 108 and the second end 110 of the main body 104. Each of the insulating element 120 and the cooling element 122 are bent inwardly at the first end 108 of the main body 104 and at the second end 110 of the main body 104 to form the pouch or frame that encapsulates the main body 104. The insulating element 120 and the cooling element 122 also each abut the electrical tabs 106. A portion of the electrical tabs 106 remains exposed for the purpose of electrical communication, for example, with additional battery cell assemblies 102 forming the battery pack (not shown).

The webs 126 of the cooling element 122 are configured to be flattened or crushed adjacent at least one peripheral edge of the cooling element 122. For example, the webs 126 are flattened where the cooling element 122 is bent inwardly at the first end 108 and the second end 110 of the main body 104. The flattened or crushed webs 126 form a flattened portion 134 that seal the cooling element 122 adjacent the main body 104, The flattened portion 134 thereby facilitates a circulation of the cooling fluid through the cooling passages 128 of the cooling element 122.

It should be appreciated that the flattened portion 134 on the opposing first and second ends 108, 110 of the man body 104 strengthens the cooling element 122 in a direction transverse to the orientation of the cooling passages 128. The flattened portion 134 militates against a collapse of the hollow cooling element 122 when compressed, for example, when the battery cell assembly 102 having the cooling element 122 is stacked adjacent additional components in the battery pack. It should be understood that the flattened portion 134 on the opposing edges of the battery cell assembly 102 make the entire cell periphery rigid enough to be used as the frame from the battery cell assembly 102. The insulating element 120 and the cooling element 122 having the flattened portion 134 and the integrated air passages 128 are sufficient to restrain the main body 104 of the battery cell assembly 102.

FIGS. 4-12 show battery cell assemblies 202, 302, 402 according to further embodiments of the present disclosure. The embodiments of FIGS. 4-12 are similar to the embodiment of FIGS. 1-3, except as described below. Like or related structure is shown in FIGS. 4-12 with reference numerals in the 200s, 300s, and 400s, instead of the 100s as shown in FIGS. 1-3, and with the remaining two digits the same.

As shown in FIGS. 4-7, the battery cell assembly 202 according to another embodiment of the disclosure has the cooling element 222 with the cooling passages 228 extending from the first end 208 of the main body 204 to the second end 210 of the main body 204. The main body 204 is sealed between the insulating element 220 and the cooling element 222 at the first side 212 and the second side 214 of the main body 204. Each of the insulating element 220 and the cooling element 222 are bent inwardly at the first side 212 of the main body 204 and at the second side 214 of the main body 204 to form the pouch that encapsulates the main body 204 of the battery cell assembly 202.

Figure 5:
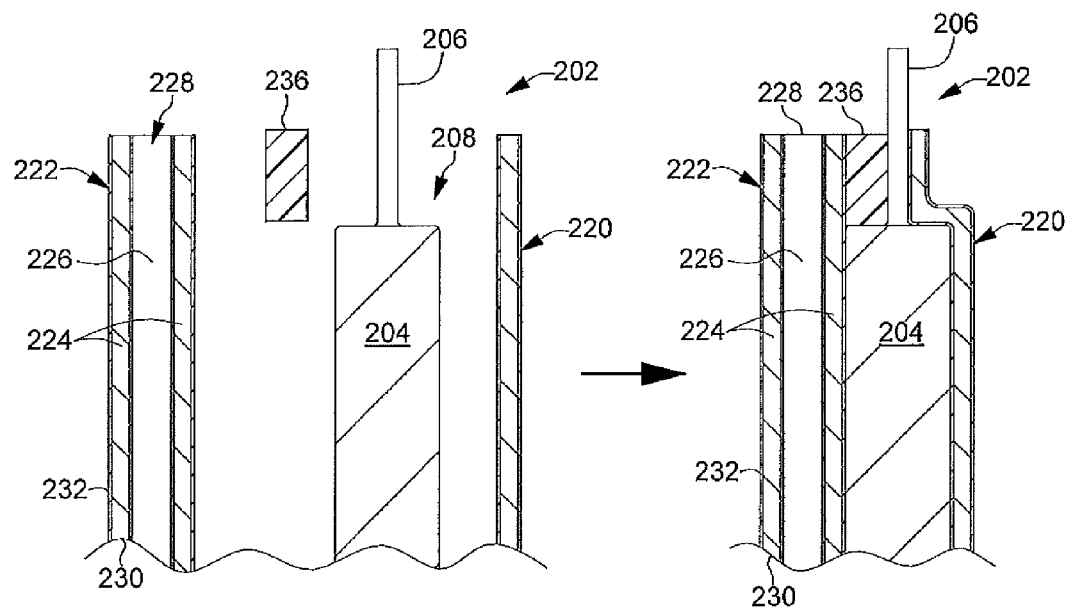
FIG. 5 is an unassembled enlarged fragmentary side elevational cross-sectional view and an assembled enlarged fragmentary side elevational cross-sectional view illustrating a stepwise assembly of the battery cell, and taken along section line 5-5 of FIG. 4.
Figure 6:
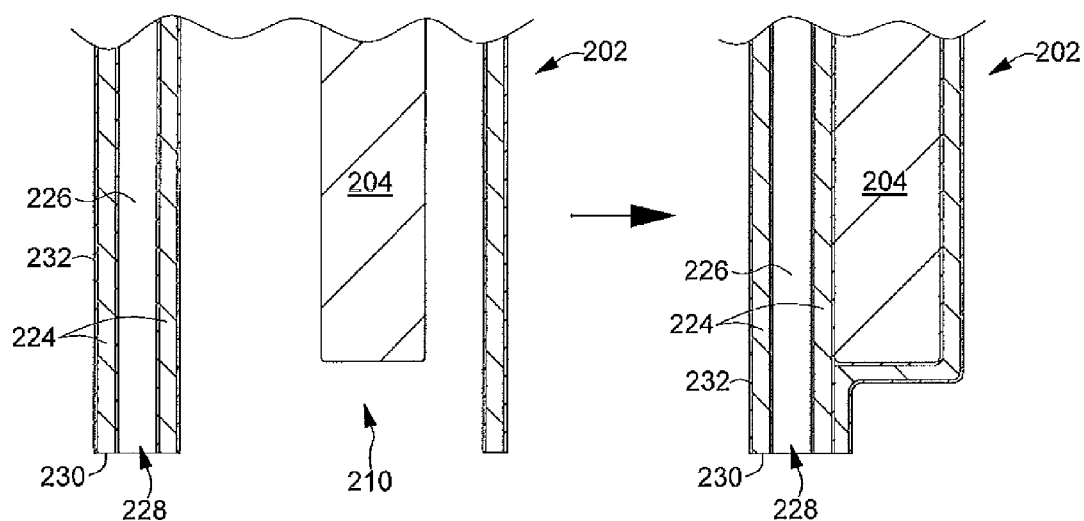
FIG. 6 is an enlarged unassembled fragmentary side elevational cross-sectional view and an enlarged assembled fragmentary side elevational cross-sectional view illustrating a stepwise assembly of the battery cell, and taken along section line 6-6 of FIG. 4.
Figure 7:
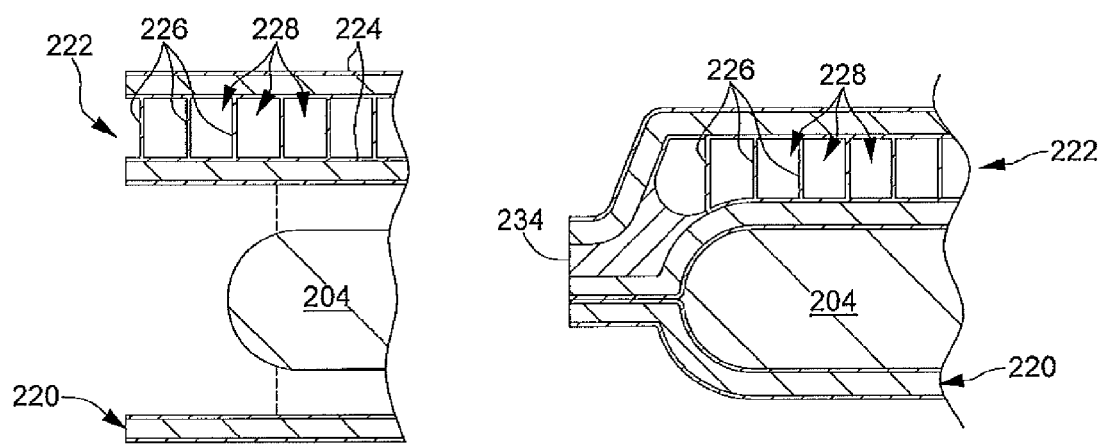
FIG. 7 is a an enlarged unassembled fragmentary top cross-sectional view and an enlarged assembled fragmentary top cross-sectional view taken along section line 7-7 of FIG. 4.

With particular reference to FIGS. 5 and 6, the insulating element 220 is bent inwardly at each of the first end 208 and the second end 210 of the main body 204. The insulating element 220 abuts the electrical tabs 206 adjacent the first end 208 of the main body 204. The insulating element 220 also abuts the cooling element 222 adjacent the second end 210 of the main body 204. An insulating member 236 is disposed between the cooling element 228 and the electrical tabs 206. The insulating member 236 is formed from a dielectric material such as a rubber or a plastic, as nonlimiting examples. The insulating member 236 allows the cooling element 228 to be sealed against the main body 204 and the electrical tabs 206 without flattening or crushing the webs 226.

Where the insulating member 236 is used, the cooling element 222 is not bent inwardly at the first end 208 of the main body 204. The cooling passages 226 thereby remain open and passable at the first end 208 and the second end 210 of the main body 204. The cooling element 222 is bent inwardly at the first side 212 and the second side 214 of the main body 204 to form the pouch that encapsulates the main body 204 of the battery cell assembly 202.

Figure 8:
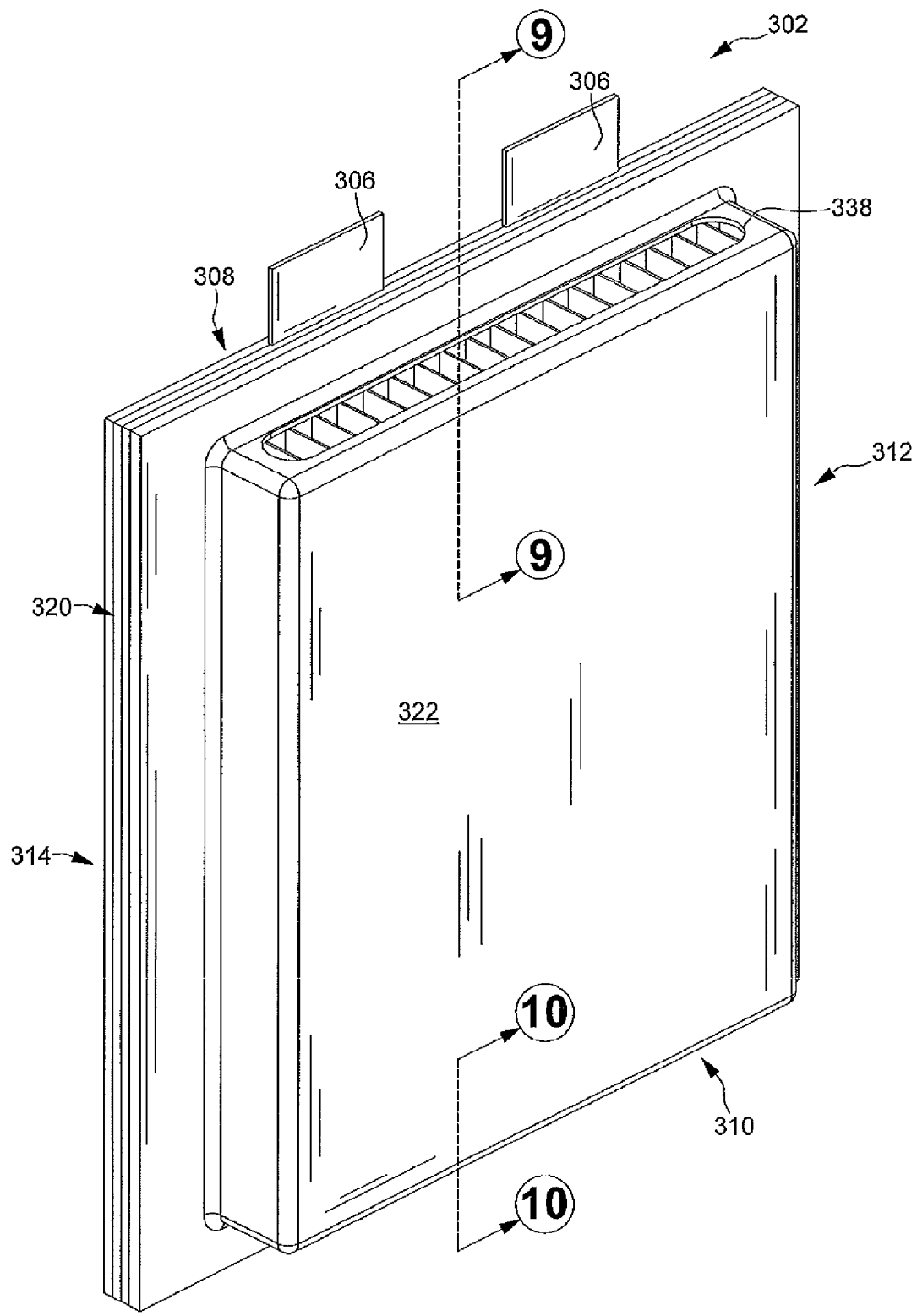
FIG. 8 is a rear perspective view of a battery cell according to a further embodiment of the present disclosure.

In a particular embodiment shown in FIGS. 8-10, the battery cell assembly 302 according to another embodiment of the disclosure has the cooling element 322 with the cooling passages 328 extending from the first end 308 of the main body 304 to the second end 310 of the main body 304, like the embodiment shown in FIGS. 4-7. However, the embodiment of FIGS. 8-10 does not employ the insulating member 236. The cooling element 322 is instead bent inwardly at each of the first end 308, the second end 310, the first side 312, and the second side 314 of the main body 304. The cooling passages 328 are made passable from the first end 308 to the second end 310 of the main body 304 by forming at least one opening 338 in one of the spaced apart layers 324 of the cooling element 322. For example, the at least one opening 338 is formed by removing a portion of at least one of the spaced apart layers 324 of the cooling element 322. The removal of the portion of at least one of the spaced apart layers 324 may be performed by a cutting operation, for example, by machine- or laser-cutting. As another example, the removal of the portion of at least one of the spaced apart layers 324 may be performed manually, for example, by being punching out or ripping away the portion of at least one of the spaced apart layers 324. The punching or ripping may be facilitated by predefined perforations formed in the spaced apart layers 324 during a manufacture of the cooling element 322. Other means for forming the at least one opening 338 may also be employed, as desired.

Figure 11:
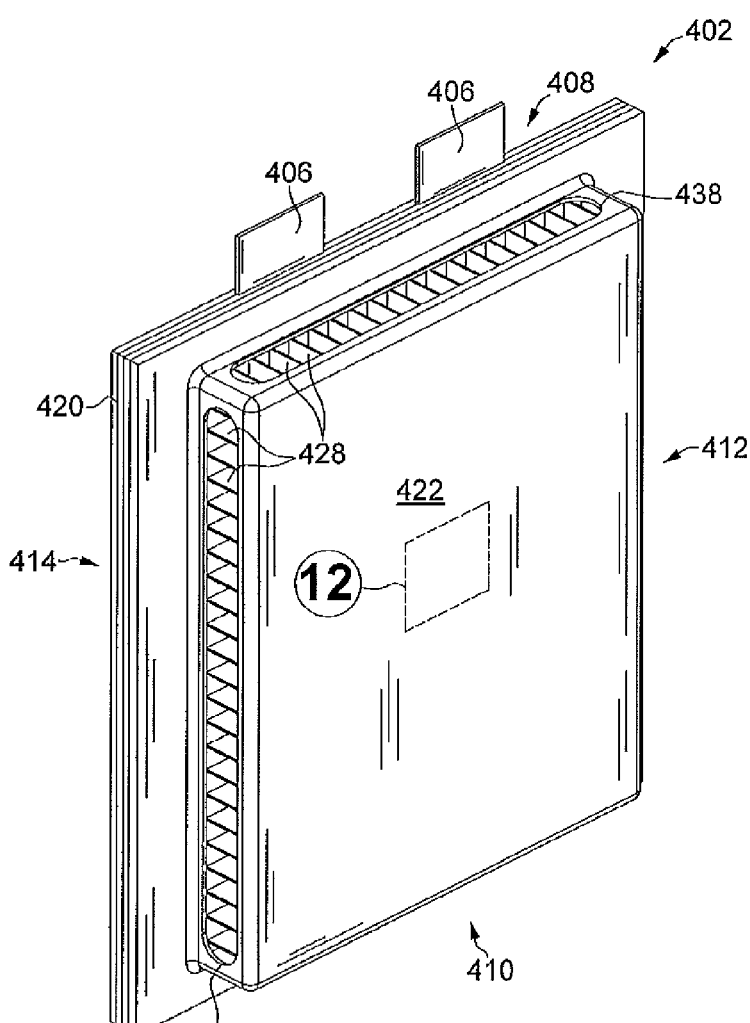
FIG. 11 is a rear perspective view of a battery cell according to an additional embodiment of the present disclosure, including features from each of the other embodiments shown in FIGS. 1-10.
Figure 12:
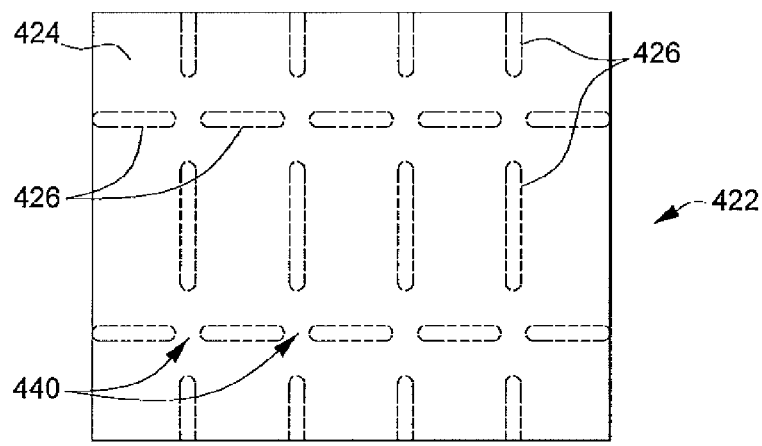
FIG. 12 is a schematic side elevational view of internal cooling passages in the battery cell depicted in box 12 of FIG. 11.

As illustrated in FIGS. 11-12, the battery cell assembly 402 may include a combination of the embodiments disclosed hereinabove. For example, the cooling passages 428 of the cooling element 422 may extend from one of the first side 412 and the second side 414 of the main body 404 to one of the first end 408 and the second end 410 of the main body 404. The cooling element 422 may be bent inwardly at each of the first and second ends 408, 410 and the first and second sides 412, 414 of the main body 404, and have the openings 438 formed therein to permit the flow of the cooling fluid through the cooling passages 428. In order for the passages 428 to extend from one of the first and second sides 412, 414 to one of the first and second ends 408, 410, the plurality of webs 426 defining the cooling passages 428 may also include gaps 440. The gaps 440 permit a flow of the cooling fluid from one of the first side 412 and the second side 414 of the main body 404 to one of the first end 408 and the second end 410 of the main body 404. The webs 426 defining the cooling passages 428 may alternatively be shaped to appropriately deliver the flow of the cooling fluid from one of the first side 412 and the second side 414 of the main body 404 to one of the first end 408 and the second end 410 of the main body 404 of the battery cell assembly 402, as desired.

Advantageously, the battery cell assembly 102, 202, 302, 402 of the present disclosure simplifies the battery pack design by eliminating the need for separate cooling fins in the battery pack. A plurality of the battery cell assemblies 102, 202, 302, 402 can be stacked against one another during assembly of the battery pack without any intervening components, and only require restraint by end frames, for example. An edge of the battery cell assembly 102, 202, 302, 402 having the open ends of the cooling passages 128, 228, 328, 428 are placed in communication with inlet and outlet manifolds to flow the cooling fluid such as air through the battery cell assembly 102, 202, 302, 402.

It should be appreciated that the heat extraction from the battery cell assembly 102, 202, 302, 402 is enhanced due to fewer interfaces in the battery pack employing the battery cell assembly 102, 202, 302, 402. By combining the function of an air cooling fin with the battery cell pouch, heat generated in the battery cell assembly 102, 202, 302, 402 is removed with minimized thermal gradients in a thickness direction of battery cell assembly 102, 202, 302, 402, which also provides a more uniform temperature distribution across the surfaces of the battery cell assembly 102, 202, 302, 402.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery cell assembly, comprising:
    a main body configured to generate power from an electrochemical reaction within the main body, the main body having a first end and a second end, a first side and a second side, and a first major surface and a second major surface;
    a pair of electrical tabs extending outwardly from at least one of the first end, the second end, the first side, and the second side of the main body;
    an insulating element disposed adjacent the first major surface of the main body; and
    a cooling element disposed adjacent the second major surface of the main body, the cooling element including at least one cooling passage, the at least one cooling passage in heat exchange relationship with the main body and configured to transfer heat generated during the electrochemical reaction away from the main body, the cooling element further including a pair of spaced apart layers with a plurality of webs disposed therebetween, the webs defining a plurality of the at least one cooling passage of the cooling element.

2. The battery cell assembly of claim 1, wherein the webs are formed from a polymer and each of the pair of spaced apart layers is formed from a metal sheet with at least one polymer coating.

3. The battery cell assembly of claim 2, wherein the polymer of the webs and the polymer coating are formed from a plastic configured to deform during an application of at least one of heat and pressure to seal the cooling element to the insulating element.

4. The battery cell assembly of claim 1, wherein the cooling passages of the cooling element extend from the first side of the main body to the second side of the main body.

5. The battery cell assembly of claim 4, wherein the main body is sealed between the insulating element and the cooling element at the first end and the second end of the main body.

6. The battery cell assembly of claim 5, wherein each of the insulating element and the cooling element are bent inwardly at the first end of the main body and at the second end of the main body to form a pouch that encapsulates the main body.

7. The battery cell assembly of claim 6, wherein the insulating element and the cooling element abut the electrical tabs, and wherein a portion of the electrical tabs is exposed.

8. The battery cell assembly of claim 6, wherein a portion of the webs are flattened where the cooling element is bent inwardly, the flattened webs sealing the cooling element adjacent the first end and the second end of the main body.

9. The battery cell assembly of claim 1, wherein the cooling passages of the cooling element extend from the first end of the main body to the second end of the main body.

10. The battery cell assembly of claim 9, wherein the main body is sealed between the insulating element and the cooling element at the first side and the second side of the main body.

11. The battery cell assembly of claim 10, wherein each of the insulating element and the cooling element is bent inwardly at the first side of the main body and at the second side of the main body to form a pouch that encapsulates the main body.

12. The battery cell assembly of claim 11, wherein the insulating element abuts the electrical tabs and an insulating member is disposed between the cooling element and the electrical tabs in order to not flatten the webs adjacent the first end of the main body, and wherein a portion of the electrical tabs is exposed.

13. The battery cell assembly of claim 11, wherein a portion of the webs are flattened where the cooling element is bent inwardly, the flattened webs sealing the cooling element adjacent the first side and the second side of the main body.

14. The battery cell assembly of claim 11, wherein each of the insulating element and the cooling element is bent inwardly at the first end of the main body and at the second end of the main body to form a pouch that encapsulates the main body, wherein the cooling element includes at least one opening in fluid communication with the cooling passages.

15. The battery cell assembly of claim 14, wherein the at least one opening is formed by removing a portion of one of the spaced apart layers of the cooling element.

16. The battery cell assembly of claim 1, wherein the cooling passages of the cooling element extend from one of the first side and the second side of the main body to one of the first end and the second end of the main body.

17. The battery cell assembly of claim 16, wherein the plurality of webs defining the cooling passages include gaps that permit a flow of a cooling fluid from one of the first side and the second side of the main body to one of the first end and the second end of the main body.

18. A battery cell assembly, comprising:
    a prismatic main body configured to generate power from an electrochemical reaction within the main body, the main body having a first end and a second end, a first side and a second side, and a first major surface and a second major surface;
    a pair of electrical tabs extending outwardly at the first end of the main body;
    an insulating element abutting the first major surface of the main body; and
    a cooling element abutting the second major surface of the main body, the cooling element including a plurality of cooling passages, the cooling element including a pair of spaced apart layers with a plurality of webs disposed therebetween, the webs defining the cooling passages of the cooling element, the cooling passages in heat exchange relationship with the main body and configured to transfer heat generated during the electrochemical reaction away from the main body,
    wherein the cooling passages of the cooling element extend from the first side of the main body to the second side of the main body.

19. A battery cell assembly, comprising:
    a prismatic main body configured to generate power from an electrochemical reaction within the main body, the main body having a first end and a second end, a first side and a second side, and a first major surface and a second major surface;

a pair of electrical tabs extending outwardly at the first end of the main body;

an insulating element abutting the first major surface of the main body; and a cooling element abutting the second major surface of the main body, the cooling element including a plurality of cooling passages, the cooling element including a pair of spaced apart layers with a plurality of webs disposed therebetween, the webs defining the cooling passages of the cooling element, the cooling passages in heat exchange relationship with the main body and configured to transfer heat generated during the electrochemical reaction away from the main body, wherein the cooling passages of the cooling element extend from the first end of the main body to the second end of the main body.

* * * * *